United States Patent
Choi et al.

(10) Patent No.: US 8,868,062 B2
(45) Date of Patent: Oct. 21, 2014

(54) INITIAL ACCESS METHOD AND APPARATUS OF USER EQUIPMENT USING POWER REDUCTION REQUEST IN HETEROGENEOUS NETWORK

(75) Inventors: Seung Hoon Choi, Suwon-si (KR); Seok Hyun Yoon, Gwangmyeong-si (KR); Joon Young Cho, Suwon-si (KR); Ju Ho Lee, Suwon-si (KR); Jin Kyu Han, Seoul (KR); Myung Hoon Yeon, Yongin-si (KR); Sang Min Ro, Seoul (KR)

(73) Assignees: Samsung Electronics Co., Ltd. (KR); Dankook University Industry Academic Cooperation Foundation (KR)

( * ) Notice: Subject to any disclaimer, the term of this patent is extended or adjusted under 35 U.S.C. 154(b) by 142 days.

(21) Appl. No.: 13/516,431

(22) PCT Filed: Dec. 22, 2010

(86) PCT No.: PCT/KR2010/009204
§ 371 (c)(1),
(2), (4) Date: Jun. 15, 2012

(87) PCT Pub. No.: WO2011/078576
PCT Pub. Date: Jun. 30, 2011

(65) Prior Publication Data
US 2012/0276895 A1    Nov. 1, 2012

(30) Foreign Application Priority Data
Dec. 23, 2009    (KR) .................. 10-2009-0129782

(51) Int. Cl.
H04W 52/04    (2009.01)
H04W 52/02    (2009.01)
H04W 48/08    (2009.01)
H04W 84/04    (2009.01)

(52) U.S. Cl.
CPC .......... *H04W 52/0235* (2013.01); *H04W 48/08* (2013.01); *H04W 84/045* (2013.01); *Y02B 60/50* (2013.01)
USPC .................. 455/422.1; 455/522; 370/350

(58) Field of Classification Search
USPC ............ 455/422.1, 522, 456.5, 571; 370/350, 370/316
See application file for complete search history.

(56) References Cited

U.S. PATENT DOCUMENTS

2010/0054237 A1* 3/2010 Han et al. ...................... 370/350

FOREIGN PATENT DOCUMENTS

| KR | 1020090105877 | 10/2009 |
| KR | 1020090120420 | 11/2009 |
| KR | 1020090120939 | 11/2009 |

OTHER PUBLICATIONS

PCT/ISA/237 Written Opinion issued on PCT/KR2010/009204 (pp. 4).

*Primary Examiner* — Phuoc H Doan
(74) *Attorney, Agent, or Firm* — The Farrell Law Firm, P.C.

(57) ABSTRACT

An initial access method of a user equipment (UE) and an apparatus performing the same are provided. The initial access method of a user equipment attempting access a macro cell base station in a network with which the macro cell base station and at least one Femto cell base station share, includes: receiving a cell ID from the macro cell base station or the Femto cell base station; transmitting an interference control request message to the Femto call base station when the received cell ID is a Femto cell ID; and receiving a macro cell ID provided from the macro cell base station when an interference control response message is received from the Femto cell base station to attempt an initial access. When a macro UE near to a Femto cell base station attempts to access a macro cell, it searches an ID of the macro cell through interference control from the Femto call base station to achieve initial access.

16 Claims, 8 Drawing Sheets

INITIAL ACCESS METHOD AND APPARATUS OF USER EQUIPMENT USING POWER REDUCTION REQUEST IN HETEROGENEOUS NETWORK

TECHNICAL FIELD

The present invention relates to a mobile communication system, and more particularly, to an initial access method of a user equipment (UE) using power reduction request in a heterogeneous network and an apparatus performing the same.

BACKGROUND ART

In recent years, a communication system in a heterogeneous network has been actively studied in a Study Item (SI) stage for Long Term Evolution-Advanced (LTE-A) of 3rd Generation Partnership Project (3GPP). The heterogeneous network means a network in which various types of a system such as a macro base station eNodeB for a Macro cell, a Femto cell base station (Home eNodeB HNB) for Femto cell, and a relay for data relay are disposed. In particular, the Femto cell means a service covering a limited zone such as a home or an office very smaller than a charging coverage of one base station of an existing mobile communication service. Further, the Femto cell provides a free wired/wireless communication service through a mobile communication terminal using a Femto cell base station HNB being a micro base station connected to an indoor-wired IP network. In this case, the micro base station provides a service to only access allowed terminals. As illustrate above, a Femto cell base station providing a service to only access allowed terminal refers to a Closed Subscriber Group eNodeB (CSG HNB), and the access allowed terminal is one member of the CSG.

DISCLOSURE OF INVENTION

Technical Problem

Meanwhile, when a UE located near to a Femto cell is not allowed to access to the Femto cell base station HNB, it should receive a synchronous signal of the macro cell base station to access thereto. However, when power of the synchronous signal from the Femto cell base station HNB is very stronger than that from the macro cell base station, a probability of failure to search an ID from the synchronous signal of the macro cell base station by the UE is increased.

Accordingly, there is a need for an interference control method capable of maintaining data transmission amount for a UE accessing the Femto cell base station HNB not to interfere with the UE accessing a Macro cell.

Solution to Problem

The present invention has been made in view of the above problems, and provides an initial access method of a UE capable of maintaining data transmission amount for the UE accessing the Femto cell base station HNB and not to interfere with a terminal accessing a Macro cell, and an apparatus thereof.

In accordance with an aspect of the present invention, an initial access method of a user equipment attempting access a macro cell base station in a network with which the macro cell base station and at least one Femto cell base station share, includes: receiving a cell ID from the macro cell base station or the Femto cell base station; transmitting an interference control request message to the Femto call base station when the received cell ID is a Femto cell ID; and receiving a macro cell ID provided from the macro cell base station when an interference control response message is received from the Femto cell base station to attempt an initial access. The interference control request message is a power reduction request message requesting power reduction of the Femto cell base station. The interference control response message is a power reduction confirmation message indicating that power of the Femto cell base station is reduced.

In accordance with another aspect of the present invention, a transmission power control method of at least one Femto cell base station in a network with which a macro cell base station and the Femto cell base station share, includes: receiving an interference control request message from a user equipment attempting to access the macro cell base station; reducing interference for the user equipment such that the user equipment accesses the macro cell base station; and transmitting an interference control response message to the user equipment. The interference control request message is a power reduction request message requesting power reduction of the Femto cell base station, and the interference control response message is a power reduction confirmation message indicating that power of the Femto cell base station is reduced. Reducing interference reduces transmission power to transmit a signal when execution of transmission power reduction is possible.

In accordance with another aspect of the present invention, a transmission power control method of at least one Femto cell base station in a network with which a macro cell base station and the Femto cell base station share, further includes: driving a transmission power timer; and restoring the transmission power to previous transmission power before execution of the transmission power reduction when operation of the driven transmission power timer is terminated, after the transmission power reduction.

In accordance with another aspect of the present invention, a transmission power control method of at least one Femto cell base station in a network with which a macro cell base station and the Femto cell base station share, further includes: restoring the transmission power to previous transmission power before execution of the transmission power reduction when an access confirmation message indicating that the user equipment accesses the macro cell base station is received from the macro call base station.

In accordance with another aspect of the present invention, a user equipment for initially accessing a macro cell base station in a network with which the macro cell base station and at least one Femto cell base station share, includes: a transceiver receiving cell access information provided from the macro cell base station or the Femto cell base station and transmitting a generated message to the macro cell base station or the Femto cell base station; a controller generating and transmitting a control request message to the Femto cell base station when reception of an Femto cell ID is sensed, and receiving a macro cell ID provided from the macro cell base station when an interference control response message is received from the macro cell base station to attempt an initial access; and a message generator generating the interference control request signal under control of the controller. The interference control request message is a power reduction request message requesting power reduction of the Femto cell base station. The interference control response message is a power reduction confirmation message indicating that power of the Femto cell base station is reduced.

In accordance with another aspect of the present invention, a Femto cell base station for controlling transmission power in a network with which a macro cell base station and at least one Femto cell base station share, includes: a transceiver receiving an interference control request message provided from a user equipment attempting to access the macro cell base station and transmitting a generated message to the user equipment; a controller reducing interference for the user equipment such that the user equipment access the macro cell base station when an interference control request message is received from the user equipment, and controlling to generate and transmit an interference control response message to the user equipment; and a message generator generating a message under control of the controller. The interference control request message is a power reduction request message requesting power reduction of the Femto cell base station, and the interference control response message is a power reduction confirmation message indicating that power of the Femto cell base station is reduced. Reducing interference reduces transmission power to transmit a signal when execution of transmission power reduction is possible. The controller drives a transmission power timer; and restores the transmission power to previous transmission power before execution of the transmission power reduction when operation of the driven transmission power timer is terminated, after the transmission power reduction. The controller restores the transmission power to previous transmission power before execution of the transmission power reduction when an access confirmation message indicating that the user equipment accesses the macro cell base station is received from the macro call base station.

Advantageous Effects of Invention

According to the present invention, a macro UE located near to the Femto cell base station may search an ID of the macro cell by controlling interference from a Femto cell base station. In addition, since the Femto cell base station restores transmission power after the macro UE accesses the macro cell base station, it can uniformly maintain data transmission amount for terminals registered therein.

BRIEF DESCRIPTION OF DRAWINGS

The objects, features and advantages of the present invention will be more apparent from the following detailed description in conjunction with the accompanying drawings, in which.

MODE FOR THE INVENTION

As used herein, the term "cell access information" may mean a cell ID or a control message necessary to access a macro cell base station or a Femto cell base station by a UE. In this case, the control message may include a power reduction request message, a power reduction confirmation message, and an access confirmation message of the present invention. The respective messages will be described in detail below.

Further, it is assumed that a following UE is a UE accessing a macro cell base station.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
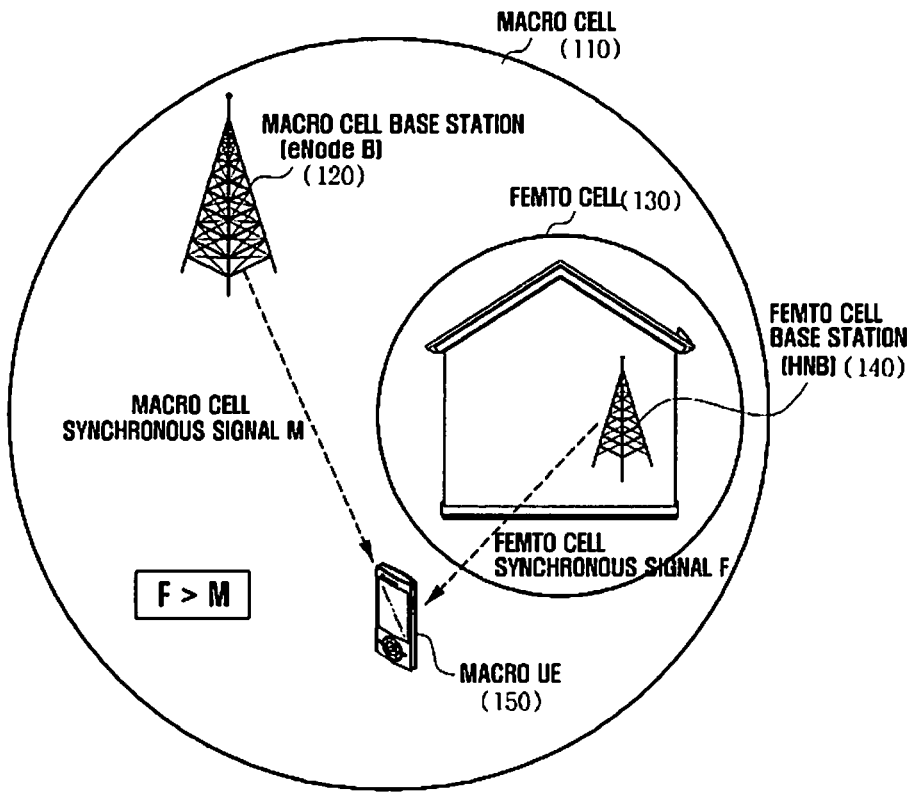
FIG. 1 is a view illustrating a configuration of a heterogeneous network in the art to which the present invention pertains.

FIG. 1 is a view illustrating a configuration of a heterogeneous network in the art to which the present invention pertains. Referring to FIG. 1, problems of the related art will also be described. As shown in FIG. 1, the heterogeneous network may includes a macro cell 110, a macro cell base station 120, a Femto cell 130, a Femto cell base station 140, and a macro UE 150.

The macro cell base station 120 provides mobile communication services such as voice or data to UEs existing in a communication service zone of the macro cell 110. Further, although is shown in FIG. 1 that the macro cell 110 includes one Femto cell 130, it can include a plurality of Femto cells 130. Hereinafter, the macro cell 110 and the macro cell base station 120 are used together with each other if necessary.

The Femto cell base station 140 provides a mobile communication service such as voice or data to UEs existing at a communication service zone of the Femto cell 130. In general, the Femto cell base station 140 provides the services to only a Femto cell dedicated UE registered in the Femto cell 130 service. However, recently, a method providing services to general UEs not registered in the Femto cell 130 service has been studied. It should be noticed that the method is not excluded from the present invention. Hereinafter, it assumed that a following Femto cell base station 140 is a CSG HNB providing services to only a Femto cell dedicated UE registered therein. In the meantime, the Femto cell base station 130 connects with a wireless network controller (not shown) to be connected to a core network (not shown) and provides a mobile communication service to UEs. Hereinafter, the Femto cell 130 and the Femto cell base station 140 are used together with each other if necessary.

The macro UE 150 is a UE that is not registered in a service provided from the Femto cell base station 140 but should receive provision of a mobile communication service from the macro cell base station 120. As described above, it is assumed that the macro user equipment 150 may access the Femto cell base station 140 according to another embodiment but the macro UE 150 receives provision of a mobile communication service through the macro cell base station 120 according to an embodiment of the present invention.

In the meantime, as shown in FIG. 1, when the macro UE 150 is located adjacent to the Femto cell base station 140 in comparison with the macro cell base station 120, a synchronous signal F from the Femto cell base station 140 may have power greater than that of a synchronous signal M from the macro cell base station 120. In this case, a probability of failure to search an ID of the macro cell base station 120 by the macro UE 150 is increased.

To solve the foregoing problems, technology for interference control between a macro cell and a Femto cell has been studied in TSG RAN 4 of 3GPP. In particular, there is suggested down link interference control relation technology of a Home eNode B in Technical reports (TR) related to TR 25.967 Home eNode B.

Figure 2:
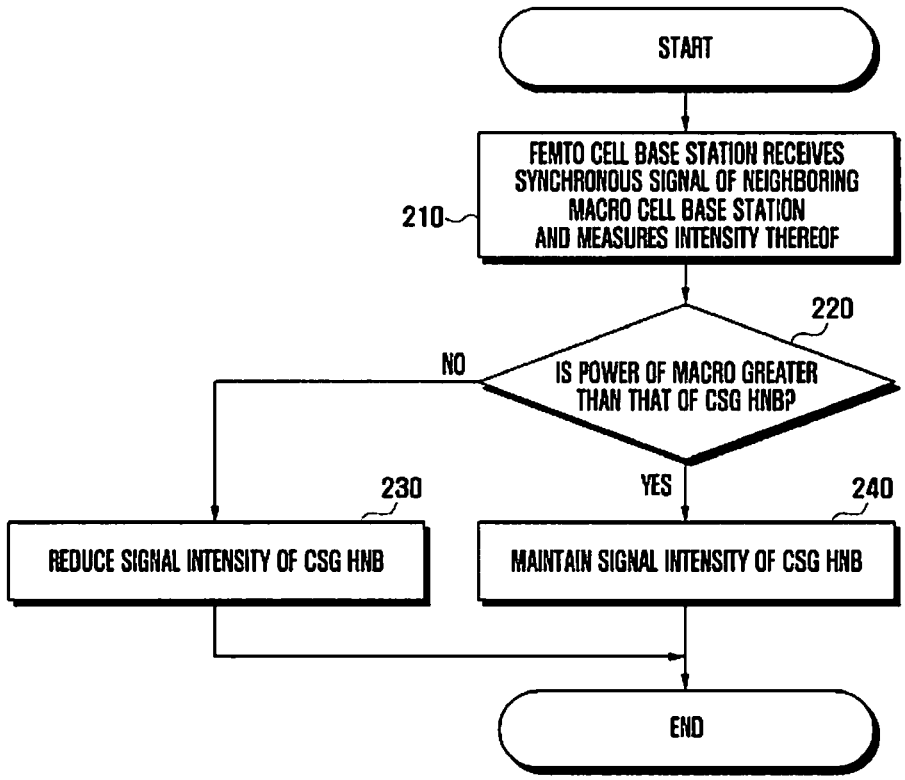
FIG. 2 is a view illustrating down link interference control technology of a Femto cell according to the related art.

FIG. 2 is a view illustrating down link interference control technology of a Femto cell. Referring to FIG. 2, the following is an explanation of technology that a Femto cell controls interference influencing on a macro UE 150 adjacent thereto.

The technology is a method reducing transmission power of a synchronous signal of the Femto cell base station 140 when the Femto cell base station 140 receives a synchronous signal from the macro cell base station 120 and the synchronous signal from the macro cell base station has power lower than that of a signal of the Femto cell base station 140.

To do this, the Femto cell base station 140 receives a synchronous signal of a neighboring macro cell base station 120 and measures strength of the synchronous signal (210). Next, the Femto cell base station 140 compares the measured strength of the synchronous signal of the macro cell base station 120 with strength of a signal served to UEs registered therein (220).

When the strength of the synchronous signal of the macro cell base station 120 is less than the strength of a signal, the Femto cell base station 140 reduces its transmission signal intensity (230). Conversely, when the strength of the synchronous signal of the macro cell base station 120 is greater than the strength of a signal, the Femto cell base station maintains its transmission signal strength (240).

In the conventional interference control method described in FIG. 2, the Femto cell base station 140 should always transmit low power to UEs served thereby for a macro UE 150. Accordingly, when a UE attempts to access the Femto cell base station 140, because it receives a signal of low power from the Femto cell base station 140, a failure probability in received signal decoding is increased. Accordingly, retransmission for a signal failed in decoding occurs. This reduces data transmission amount.

Consequently, there is a need for an interference control method capable of maintaining a data transmission amount of a UE receiving a service from the Femto cell base station 140 not to interfere with user equipments 150 that should access the macro cell base station 120.

To do this, hereinafter, a macro user equipment 150 according to an embodiment of the present invention transmits an interference control request message indicating that it currently interferes with the Femto cell base station 140 to the Femto cell base station 140. Accordingly, the Femto cell base station 140 performs an interference control procedure to reduce inference with the macro UE 150 and transmits an interference control response message to the macro UE 150 as the result. As a result, the macro user equipment 150 may access the macro cell base station 210.

In the embodiment of the present invention to be described below, assuming that the interference control request message is a power reduction request and an interference control response message is a power reduction confirmation message, a procedure reducing power of the Femto cell base station 140 to control interference between the macro UE 150 and the Femto cell base station 140 will be described. However, the present invention is not limited thereto. It should be noticed that the same principle is applicable to various modified embodiments for controlling interference between the macro UE 150 and the Femto cell base station 140 besides power reduction.

Figure 3:
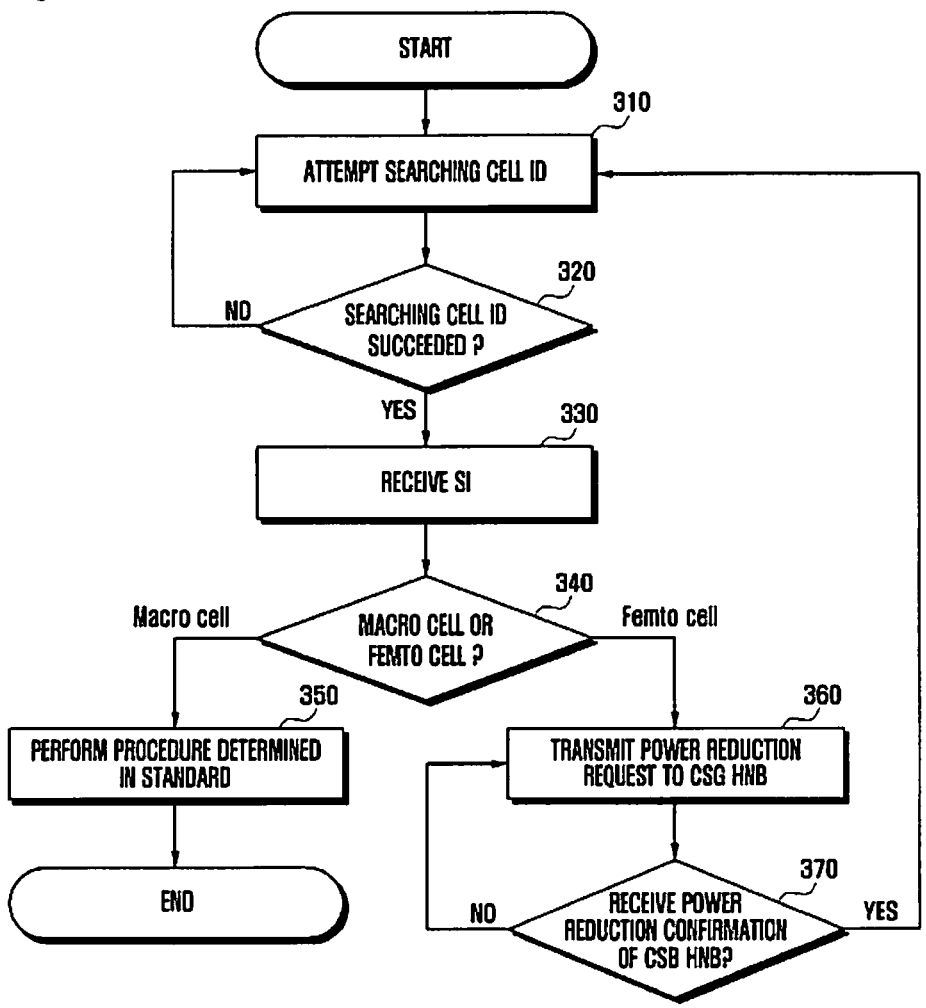
FIG. 3 is a flowchart illustrating a procedure receiving a synchronous signal from a macro cell base station using an interference control request when a macro UE in the vicinity of a Femto cell base station accesses the macro cell base station according to an exemplary embodiment of the present invention.

FIG. 3 is a flowchart illustrating a procedure receiving a synchronous signal from a macro cell base station 120 using an interference control request when a macro UE 150 in the vicinity of a Femto cell base station 140 accesses the macro cell base station 120 according to an exemplary embodiment of the present invention.

First, the macro user equipment 150 attempts searching a cell ID from a synchronous signal (310). Next, the macro UE 150 checks whether searching the cell ID is succeeded (320).

When searching the cell ID fails, the macro UE 150 returns to step 310 and repeatedly attempts searching the cell ID. When searching the cell ID is succeeded, the macro UE 150 receives and decodes System Information (SI) (330).

The macro user equipment 150 checks whether a searched cell is a macro cell or a Femto cell using the SI (340)

When it is determined that the searched ID is the macro cell ID from the SI, the macro UE 150 performs a procedure determined in a standard (350). When power of a synchronous signal of the macro cell base station 120 is greater than that of a signal of the Femto cell base station 140, a probability searching the macro cell ID by the macro user equipment is increased.

Conversely, when the searched cell ID from the SI is a Femto cell ID, the macro UE 150 transmits a power reduction request to the Femto cell base station 140 (360). Accordingly, as described below, when the Femto cell base station 140 enables power reduction execution, it reduces transmission power and transmits a power reduction confirmation message to the macro UE 150.

Subsequently, the macro UE 150 receives the power reduction confirmation message from the Femto cell base station 140 (370). Accordingly, the macro UE 150 returns to step 310 and performs steps 310 to 350 to acquire a macro cell ID.

In the meantime, when the macro UE 150 according to an embodiment of the present invention is a terminal capable of accessing the Femto cell base station 140, it can attempt to access a corresponding Femto cell base station 140.

Figure 4:
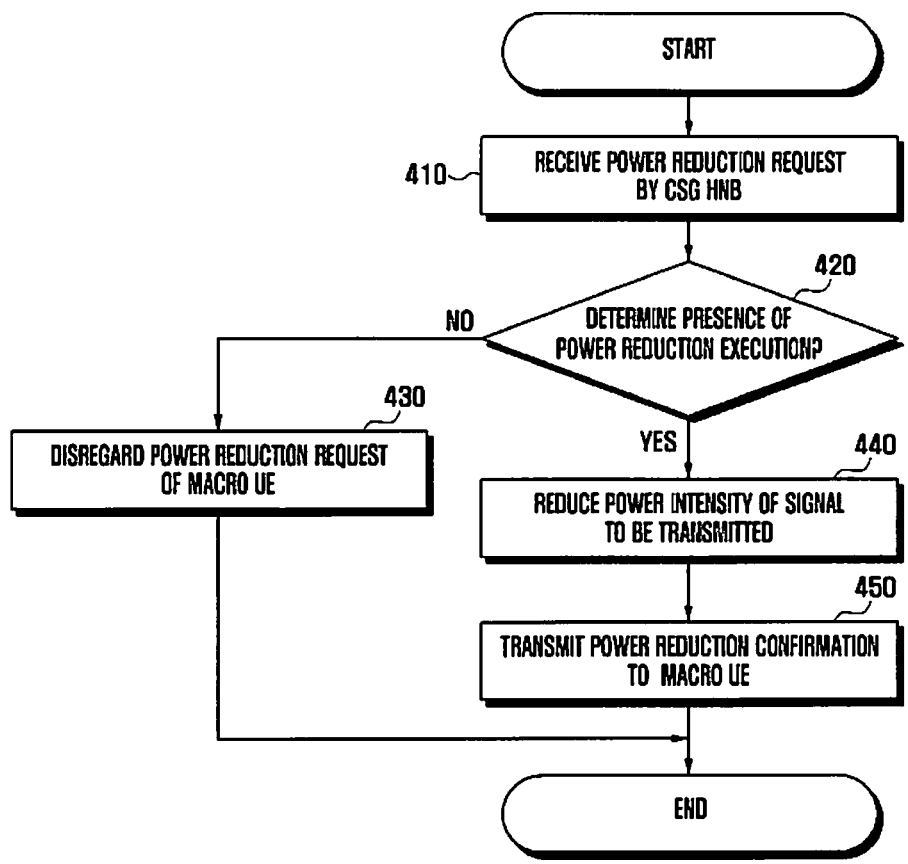
FIG. 4 is a flowchart illustrating a power control procedure of a Femto cell base station according to an interference control request of a macro UE according to an embodiment of the present invention.

FIG. 4 is a flowchart illustrating a power control procedure of a Femto cell base station 140 according to an interference control request of a macro UE 150 according to an exemplary embodiment of the present invention.

First, the macro UE 150 transmits a power reduction request message to the Femto cell base station 140 through a procedure shown in FIG. 4. Accordingly, the Femto cell base station 140 receives a power reduction request message from the macro UE 150 (410). Next, the Femto cell base station 140 determines presence of power reduction execution (420). In an embodiment of the present invention, when the Femto cell base station 140 should provide a service to UEs registered therein or there is a large amount of data to be transmitted, it cannot perform power reduction. As described above, when the Femto cell base station 140 cannot perform power reduction, it disregards the power reduction request of the macro user equipment (430).

Conversely, when the power reduction execution is possible, the Femto cell base station 140 reduces power intensity of a signal to be transmitted to UEs (440). Subsequently, the Femto cell base station 140 transmits a power reduction confirmation message to the macro UE 150 (450).

Figure 5:
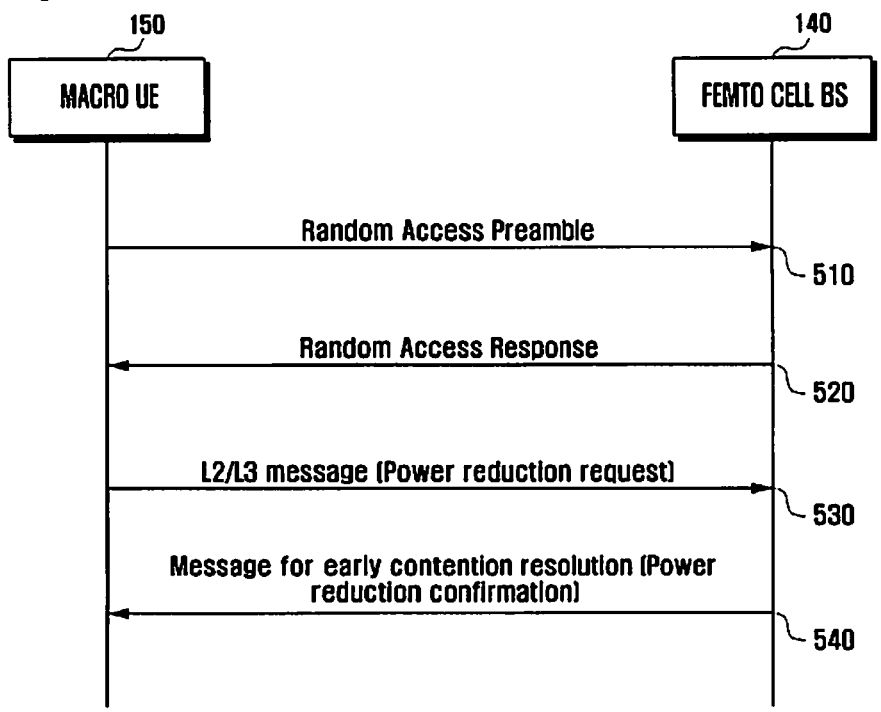
FIG. 5 is a flowchart illustrating an interference control request procedure of a macro UE and a confirmation message transmission procedure of a Femto cell base station in a random access execution step as a detailed embodiment of an interference control procedure shown in FIG. 3 and FIG. 4.

FIG. 5 is a flowchart illustrating an interference control request procedure of a macro UE 150 and a confirmation message transmission procedure of a Femto cell base station 140 in a random access execution step as a detailed embodiment of an interference control procedure shown in FIG. 3 and FIG. Hereinafter, an embodiment shown in FIG. 5 including flowcharts shown in FIG. 3 and FIG. 4 will be explained.

FIG. 5 shows a procedure transmitting a power reduction request message to a Femto cell base station 140 through a random access by a macro UE 150 received a Femto cell ID and receiving a power reduction confirmation message in response thereto by the Femto cell base station 140.

The macro UE 150 can acquire relation information to perform a random access process for the Femto cell base station 140 from SI of the Femto cell base station 140 at step 303 of FIG. 3. Accordingly, the macro UE 150 can perform a random access procedure for the Femto cell base station 140 after recognizing that a sensed cell ID is a Femto cell ID at step 340. The random access procedure is shown in FIG. 5.

The macro UE 150 transmits a random access preamble to a Femto base station 140 (510 of FIG. 5). Next, the Femto cell base station 140 transmits a random access response to the macro UE 150 (520).

Subsequently, the macro UE 150 transmits an L2/L3 message including a power reduction request message to the Femto cell base station 140 (530). In a case where the Femto cell base station 140 receives the power reduction request message from the macro UE 150, when it is determined at step 420 of FIG. 4 that the power reduction procedure can be performed, it perform power reduction (440). Further, the Femto cell base station 140 transmits a message for early contention resolution including a power reduction confirmation message to the macro UE 150 (540 of FIG. 5).

When the macro UE 150 receives the power reduction confirmation message from the Femto cell base station 140 at step 370 of FIG. 3, it returns to step 310 and performs steps 310 to 350 to acquire a macro cell ID.

Figure 6:
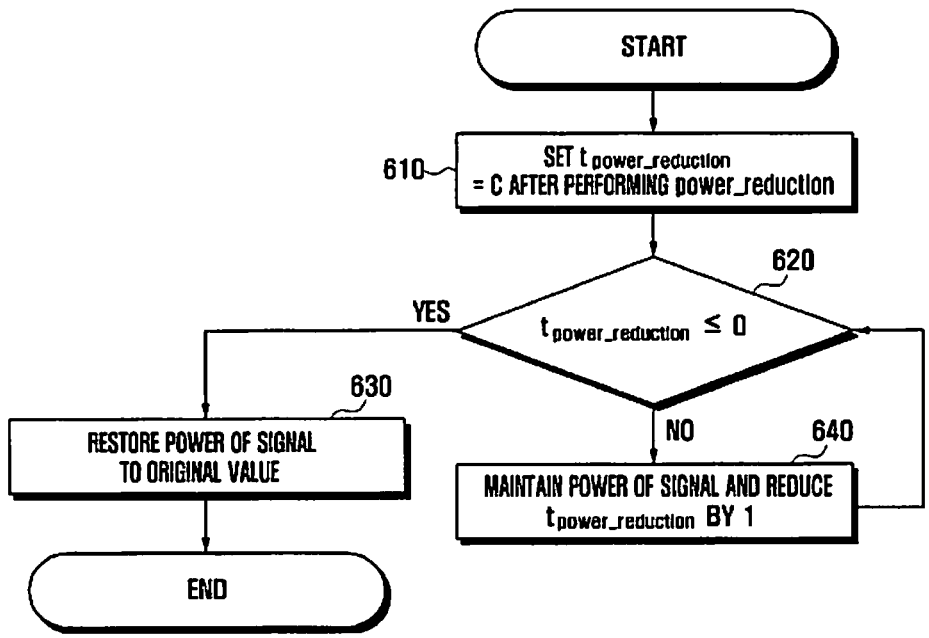
FIG. 6 is a flowchart illustrating a procedure restoring signal strength after execution of power reduction by a Femto cell base station according to an embodiment of the present invention.

FIG. 6 is a flowchart illustrating a procedure restoring signal strength after execution of power reduction by a Femto cell base station according to an embodiment of the present invention.

First, after the Femto cell base station 140 performs power reduction, it sets a power reduction timer to a constant C (tpower_reduction=C) (610). Next, the Femto cell base station 140 checks whether the power reduction timer operation is terminated (620).

When the power reduction timer operation is not terminated, the Femto cell base station 140 maintains strength of a signal to be transmitted and reduces a value of the power reduction timer by one (640). When the power reduction timer operation is terminated, the Femto cell base station 140 restores the intensity of a signal to be transmitted to a previous intensity of reduction of the signal intensity according to an interference control request of the macro UE (630).

Figure 7:
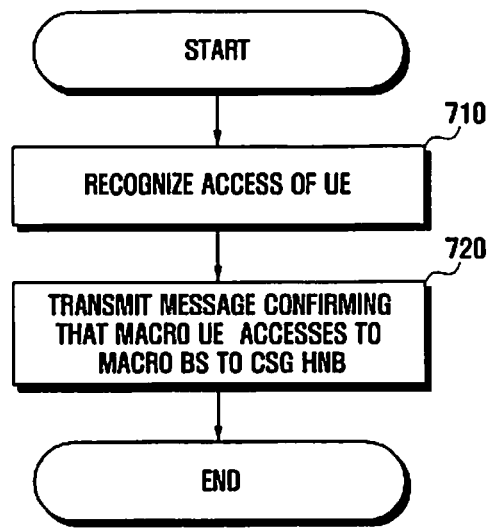
FIG. 7 and FIG. 8 are flowcharts illustrating procedures restoring signal strength after execution of power reduction by a Femto cell base station according to other embodiments of the present invention, respectively.
Figure 8:
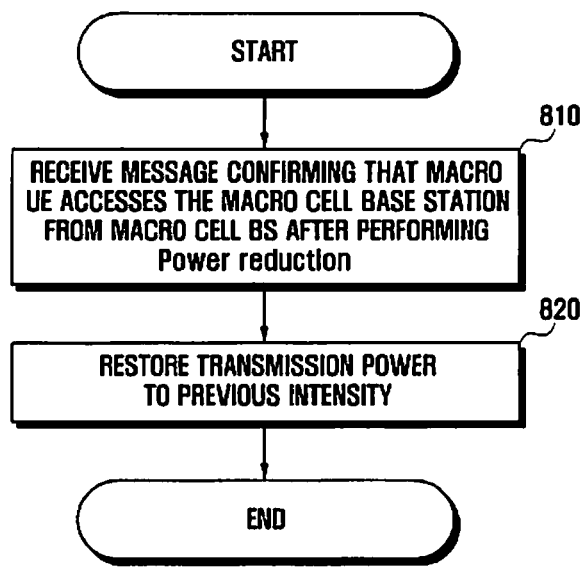

FIG. 7 and FIG. 8 are flowcharts illustrating procedures again restoring signal strength after execution of power reduction by a Femto cell base station 140 according to other embodiments of the present invention, respectively. Here, FIG. 7 shows a signal transmitting/receiving procedure of a macro cell base station 120, and FIG. 8 shows a restoring procedure of signal intensity of the Femto cell base station 140.

First, FIG. 7 is illustrated.

A macro cell base station 120 recognizes access of a macro UE 150 (710). In this case, the macro UE 150 transmits a Femto cell ID acquired in a procedure performing a random access and a power reduction confirmation message received from the Femto cell base station 120 to the macro cell base station 120. Accordingly, the macro cell base station 120 may recognize that the macro UE 150 requests power reduction to the Femto cell base station 140 and the Femto cell base station 140 performs power reduction.

The macro cell base station 120 transmits an access confirmation message confirming that the macro UE 150 accesses thereto to the Femto cell base station 140 (720). Accordingly, the Femto cell base station 140 receives the access confirmation message and restores signal intensity, and a detailed description thereof will be given with reference to FIG. 8.

In FIG. 8, after the Femto cell base station 140 performs power reduction, it receives an access confirmation message from the macro cell base station 120 (810). The access confirmation message is a message confirming that the macro UE 150 successfully accesses the macro cell base station 120.

Subsequently, the Femto call base station 140 restores transmission power to previous strength before performing power reduction (820).

Figure 9:
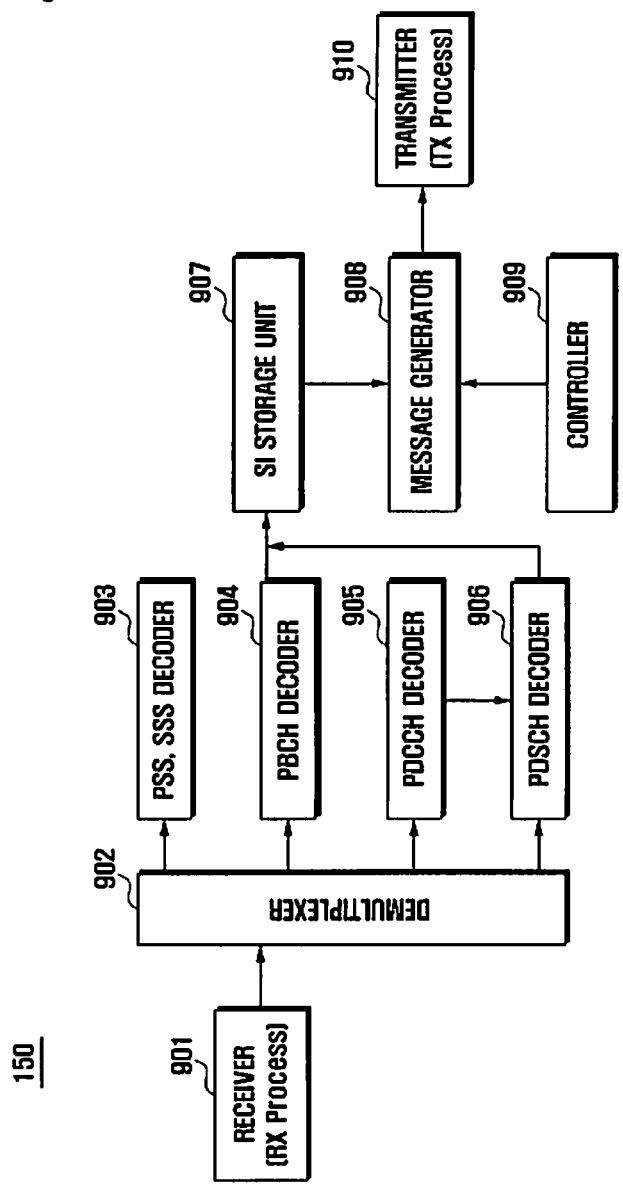
FIG. 9 is a block diagram illustrating an internal configuration of a macro UE according to an embodiment of the present invention.

FIG. 9 is a block diagram illustrating an internal configuration of a macro UE 150 according to an embodiment of the present invention. Referring to FIG. 9, the macro UE 150 may include a receiver 901, a demultiplexer 902, a PSS/SSS decoder 903, a PBCH decoder 904, a PDCCH decoder 905, a PDSCH decoder 906, a system information storage unit 907, a message generator 908, a controller 909, and a transmitter 910.

A signal received by the receiver 901 is divided by the demultiplxer 920. The divided signals are input to the PSS/SSS decoder 903, the PBCH decoder 904, the PDCCH decoder 905, and the PDSCH decoder 906, respectively.

Here, the macro UE 150 acquires a physical cell identification through a decoding result of the PSS/SSS decoder 903, and acquires a Master Information Block (MIB) through a decoding result of the PBCH decoder 904, and stores the acquired physical cell identification and MIB in the SI storage unit 907.

Further, the macro UE 150 acquires a System Information Block (SIB) through decoding results of the PDCCH decoder 905 and the PDSCH decoder 906, and the acquired SIB in the storage unit 907.

The controller 909 checks whether a received cell ID stored in the SI storage unit 907 is a macro cell ID or a Femto cell ID. When the received cell ID is the Femto cell ID, the controller 909 controls the message generator 908 to generate an interference control request message, namely, a power reduction request message. Further, the controller 909 controls the transmitter 910 to transmit the power reduction request message generated by the message generator 908 to the Femto cell base station 140. Moreover, the controller 909 checks whether the interference control response message, namely, a power reduction confirmation message is received from the Femto cell base station 140 through the receiver 901. When the power reduction confirmation message is received, the controller 909 controls to restart a procedure acquiring a macro cell ID.

Figure 10:
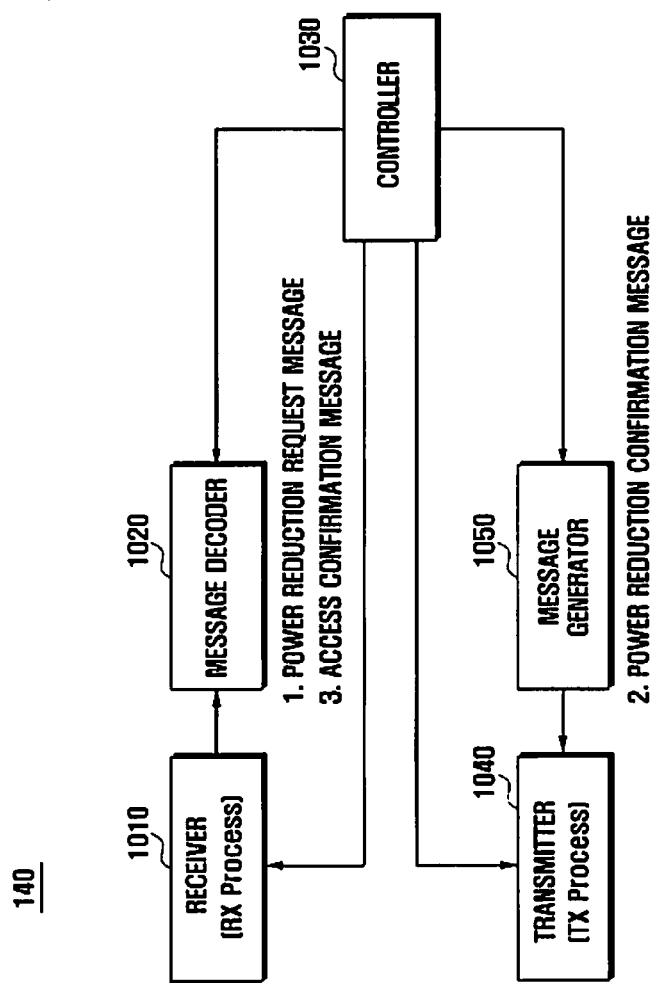
FIG. 10 is a block diagram illustrating an internal configuration of a Femto cell base station according to an embodiment of the present invention.

FIG. 10 is a block diagram illustrating an internal configuration of a Femto cell base station 140 according to an embodiment of the present invention. Referring to FIG. 10, the Femto cell base station 140 may include a receiver 1010, a message decoder 1020, a controller 1030, a transmitter 1040, and a message generator 1050.

A message received through the receiver 1010 is transferred to the message decoder 1020. Accordingly, the message decoder 1020 decodes and transfers the message to the controller 1030.

The controller 1030 receives the decoded message from the message decoder 1020. When the received message is an interference control request message, namely, a power reduction request message, the controller 1030 controls transmission power of the transmitter 1040 to be reduced. Simultaneously, the controller 1030 controls the message generator 1050 to generate an interference control response message, namely, a power reduction confirmation message, and to transmit the generated power reduction confirmation message to the macro UE 150 through the transmitter 1040.

Moreover, in an embodiment of the present invention, after the controller 1030 reduces transmission power, it may sense that an access confirmation message is received from the macro cell base station 120. Accordingly, the controller 1030 controls the transmitter 1040 to restore the transmission power to previous strength before power reduction.

Figure 11:
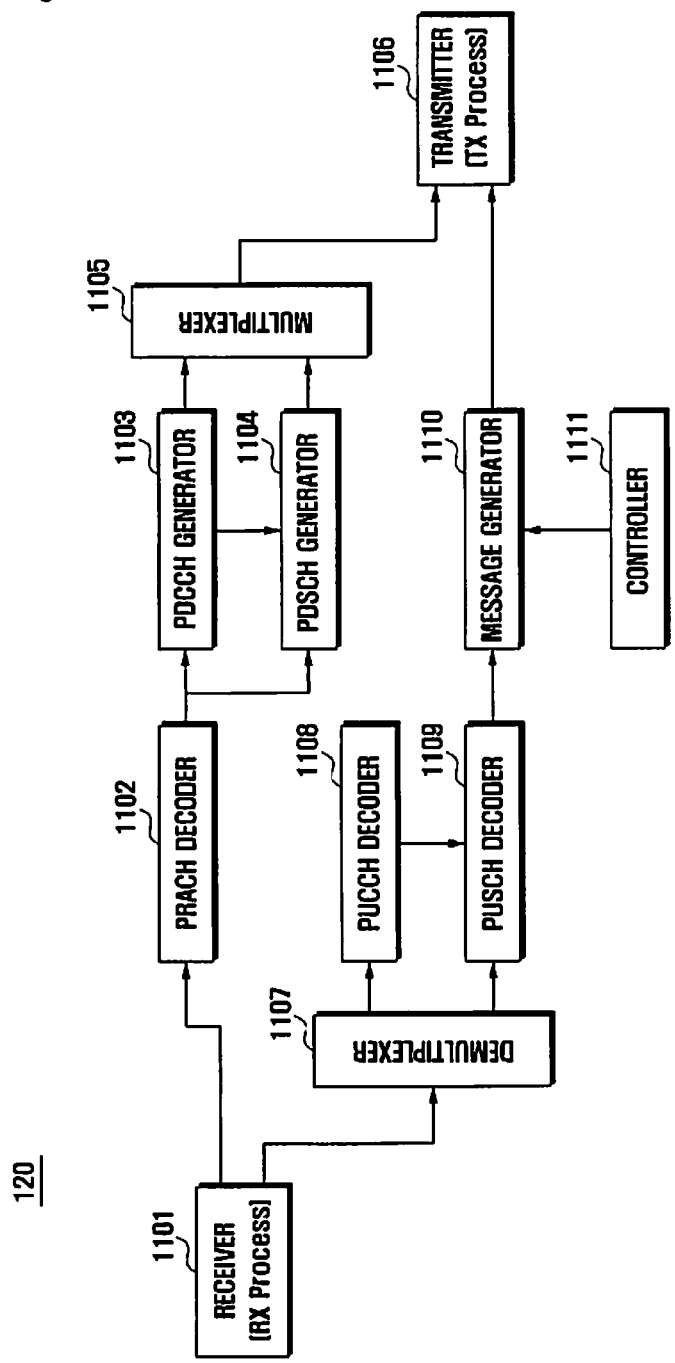
FIG. 11 is a block diagram illustrating an internal configuration of a macro cell base station according to an embodiment of the present invention.

FIG. 11 is a block diagram illustrating an internal configuration of a macro cell base station 120 according to an embodiment of the present invention. Referring to FIG. 11, the macro cell base station 120 may include a receiver 1101, a PRACH decoder 1102, a PDCCH generator 1103, a PDSCH generator 1104, a multiplexer 1105, a transmitter 1106, a demultiplexer 1107, a PUCCH decoder 1108, a PUSCH decoder 1109, a message generator 1110, and a controller 1111.

A PRACH signal of the macro UE 150 received by the receiver 1101 is transferred to the PRACH decoder 1102 such that the PRACH decoder 1102 decodes it. The decoded PRACH signal is transferred to the PDCCH generator 1103 and the PDSCH generator 1104, and the PDCCH generator 1103 and the PDSCH generator 1104 generate a PDCCH signal and a PDSCH signal, respectively. The multiplexer 1105 multiplexes the PDCCH signal and the PDSCH signal and transfers the multiplexed signal to the macro UE 150 as a random access response.

The receiver 110 receives an L2/L3 message provided from the macro UE 150 and transfers the received L2/L3 message to the demultiplexer 1107. A multiplexed signal is input to the PUCCH decoder 1108 and the PUSCH decoder 1109, and the PUCCH decoder 1108 and the PUSCH decoder 1109 decodes it. Accordingly, the macro cell base station may receive a Femto cell ID and a power reduction confirmation message provided from the macro UE 150 at step 710 of FIG. 7.

Accordingly, the controller 1111 controls the message generator 1110 to generate an access confirmation message. Further, the controller 1111 controls the transmitter 1106 to transmit the generated access confirmation message to the Femto cell base station 140.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. An initial access method of a user equipment attempting access a macro cell base station in a network with which the macro cell base station and at least one Femto cell base station share, comprising:
   receiving a cell ID from the macro cell base station or the Femto cell base station;
   transmitting an interference control request message for a power reduction of the Femto cell base station to the Femto cell base station when the received cell ID is a Femto cell ID; and
   receiving a macro cell ID provided from the macro cell base station when an interference control response message is received from the Femto cell base station to attempt an initial access.

2. The method of claim 1, wherein the interference control request message is a power reduction request message requesting power reduction of the Femto cell base station.

3. The method of claim 2, wherein the interference control response message is a power reduction confirmation message indicating that power of the Femto cell base station is reduced.

4. A transmission power control method of at least one Femto cell base station in a network with which a macro cell base station and the Femto cell base station share, comprising:
   receiving an interference control request message for power reduction of the Femto cell base station from a user equipment attempting to access the macro cell base station;
   reducing interference for the user equipment such that the user equipment accesses the macro cell base station; and
   transmitting an interference control response message to the user equipment.

5. The transmission power control method of claim 4, wherein the interference control request message is a power reduction request message requesting power reduction of the Femto cell base station, and the interference control response message is a power reduction confirmation message indicating that power of the Femto cell base station is reduced.

6. The transmission power control method of claim 5, wherein reducing interference reduces transmission power to transmit a signal when execution of transmission power reduction is possible.

7. The transmission power control method of claim 6, further comprising:
   driving a transmission power timer, and
   restoring the transmission power to previous transmission power before execution of the transmission power reduction when operation of the driven transmission power timer is terminated, after the transmission power reduction.

8. The transmission power control method of claim 6, further comprising restoring the transmission power to previous transmission power before execution of the transmission power reduction when an access confirmation message indicating that the user equipment accesses the macro cell base station is received from the macro cell base station.

9. A user equipment for initially accessing a macro cell base station in a network with which the macro cell base station and at least one Femto cell base station share, comprising:
   a transceiver receiving cell access information provided from the macro cell base station or the Femto cell base station and transmitting a generated message to the macro cell base station or the Femto cell base station;

a controller generating and transmitting a control request message for a power reduction of the Femto cell base station to the Femto cell base station when reception of an Femto cell ID is sensed, and receiving a macro cell ID provided from the macro cell base station when an interference control response message is received from the macro cell base station to attempt an initial access; and a message generator generating the interference control request signal under control of the controller.

10. The user equipment of claim 9, wherein the interference control request message is a power reduction request message requesting power reduction of the Femto cell base station.

11. The user equipment of claim 10, wherein the interference control response message is a power reduction confirmation message indicating that power of the Femto cell base station is reduced.

12. A Femto cell base station for controlling transmission power in a network with which a macro cell base station and at least one Femto cell base station share, comprising:

a transceiver receiving an interference control request message provided from a user equipment attempting to access the macro cell base station and transmitting a generated message to the user equipment;

a controller reducing interference for the user equipment such that the user equipment access the macro cell base station when an interference control request message for a power reduction of the Femto cell base station is received from the user equipment, and controlling to generate and transmit an interference control response message to the user equipment; and a message generator generating a message under control of the controller.

13. The Femto cell base station of claim 12, wherein the interference control request message is a power reduction request message requesting power reduction of the Femto cell base station, and the interference control response message is a power reduction confirmation message indicating that power of the Femto cell base station is reduced.

14. The Femto cell base station of claim 13, wherein reducing interference reduces transmission power to transmit a signal when execution of transmission power reduction is possible.

15. The Femto cell base station of claim 14, wherein the controller drives a transmission power tinier; and restores the transmission power to previous transmission power before execution of the transmission power reduction when operation of the driven transmission power timer is terminated, after the transmission power reduction.

16. The Femto cell base station of claim 14, wherein the controller restores the transmission power to previous transmission power before execution of the transmission power reduction when an access confirmation message indicating that the user equipment accesses the macro cell base station is received from the macro cell base station.

\* \* \* \* \*